United States Patent [19]

Andersson

[11] Patent Number: 4,915,523
[45] Date of Patent: Apr. 10, 1990

[54] DEVICE FOR COUPLING A FEMALE MEMBER TO A MALE MEMBER

[75] Inventor: Kjell Andersson, Fagersta, Sweden
[73] Assignee: Seco Tools AB, Sandviken, Sweden
[21] Appl. No.: 341,814
[22] Filed: Apr. 24, 1989

[30] Foreign Application Priority Data

May 6, 1988 [SE] Sweden ................................ 8801717

[51] Int. Cl.$^4$ .............................................. B25G 3/00
[52] U.S. Cl. ..................................... 403/11; 403/261; 403/362; 409/234; 82/160
[58] Field of Search .................. 403/261, 362, 259, 11; 409/234, 232; 82/160

[56] References Cited

U.S. PATENT DOCUMENTS

| | | | |
|---|---|---|---|
| 4,508,263 | 4/1985 | Pedersen et al. ................ | 403/362 X |
| 4,597,699 | 7/1986 | Ramunas ............................. | 409/232 |
| 4,813,831 | 3/1989 | Reinauer ............................. | 409/232 |

FOREIGN PATENT DOCUMENTS 7800009 8/1979 Sweden ................................ 409/234

Primary Examiner—Andrew V. Kundrat
Attorney, Agent, or Firm—Burns, Doane, Swecker & Mathis

[57] ABSTRACT

A device for coupling a female member (11) to a male member (10), the male member (10) having a spigot (12) with an internal boring (13) extending in the longitudinal direction of the spigot (12). The female member (11) has a cavity (15) that receives the spigot (12) by slide-fit in a coupled state of the member (10, 11). Such devices often require several clamping elements to be activated. The present device requires only one clamping element to be activated, and has a screw assembly (14) mounted in the internal boring (13) and the screw assembly (14) includes a floating washer (34).

14 Claims, 3 Drawing Sheets

DEVICE FOR COUPLING A FEMALE MEMBER TO A MALE MEMBER

BACKGROUND AND OBJECTS OF THE INVENTION

The present invention relates to a device for coupling a female member to a male member, a male member having a spigot with an internal boring extending in the longitudinal direction of the spigot, said female member having a cavity that receives the spigot by slide-fit in a coupled state of the members. The invention also relates to a screw assembly per se.

From SE-C-7800009-8 is previously known a device of the type described above. A spigot of the male member holds a screw that projects longitudinally out from the spigot. The female member holds at least three circumferentially distributed clamping screws that extend radially relative to the spigot and cooperate with the head of the screw in operative position. However, a major disadvantage of the device according to SE-C-7800009-8 is that all three clamping screws must be activated when a coupling or an uncoupling of the female and male members is carried out. It is at once realized that since all three clamping screws must be activated the operations are quite time consuming.

The present invention has the aim of providing a device of the type mentioned above, the device, upon coupling or uncoupling of the female and male members, being activated through only one clamping screw.

SUMMARY OF THE INVENTION

The aim of the present invention is realized by a device that comprises a male member and a female member coupled together by a connecting mechanism. The male member includes a longitudinally forwardly projecting spigot in which there is a forwardly open rearwardly extending recess. The male member includes a rearwardly open forwardly extending cavity. A portion of the cavity receives the spigot with a sliding fit. At least two retaining pins are mounted in the female member, the pins lying in a common radial plane. The pins include inner ends projecting generally radially into the cavity. A clamping member is mounted in the female member and lies in the common radial plane containing the retaining pins. The clamping member is displaceable generally radially inwardly and outwardly. The connecting mechanism comprises a fastener which includes a shaft detachably secured in the recess. A collar is disposed forwardly of the shaft and has a larger cross-sectional dimension than that of the shaft. Rearward movement of the collar is opposed by a front end of the spigot. The fastener further includes a neck arranged forwardly of the collar and a head connected to a front end of the neck. The head has a cross-sectional dimension larger than that of the neck. A radially floatable washer is mounted with radial play on the neck. The washer includes an outer peripheral surface which is sized to permit the washer to be inserted longitudinally into and from the cavity, whereupon the outer peripheral surface contacts the inner ends of the retaining pins and is displaced radially thereby to permit passage of the washer longitudinally past the retaining pins.

BRIEF DESCRIPTION OF THE DRAWINGS

Below an embodiment of the present invention will be described, reference being made to the accompanying drawings, where.

DETAILED DESCRIPTION OF A PREFERRED EMBODIMENT OF THE INVENTION

Figure 1:
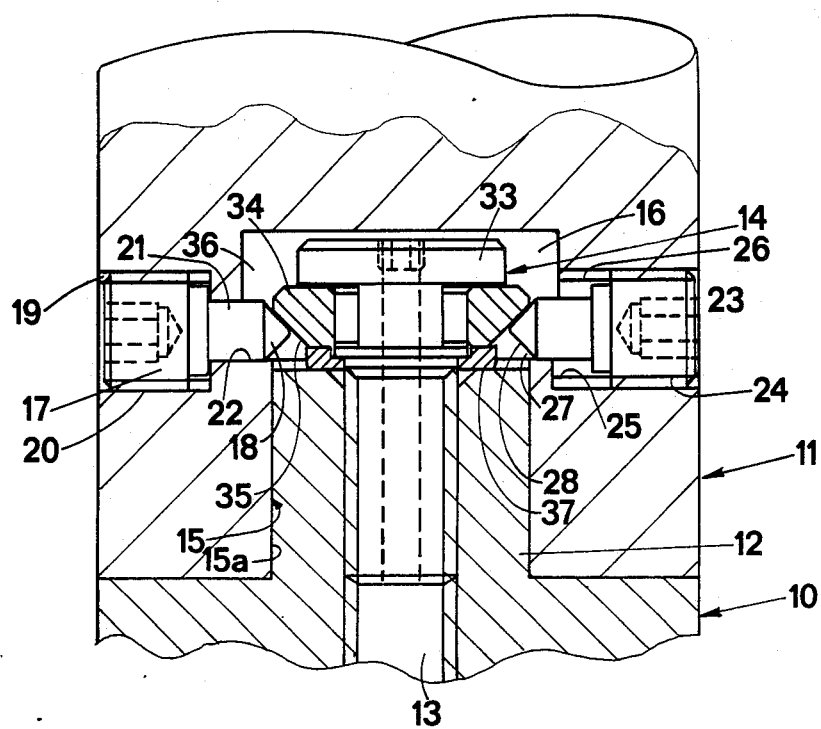
FIG. 1 is a longitudinal sectional view through the device according to the invention and the members to be coupled.

In FIG. 1 is disclosed a male member 10 and a female member 11.

The male member 10 includes a forwardly projecting spigot 12 having an a recess such as a internally threaded boring 13. In the disclosed embodiment said boring is forwardly open and extends longitudinally or axially rearwardly beyond the inner or rear end of the spigot 12.

In the internally threaded boring 13 a connecting device in the form of a assembly 14 is received. This screw assembly 14 has a special structural design and will be described in detail below with reference to FIG. 3. The male member 10 usually is in the shape of a standard tapered shank.

The female member 11 comprises a cavity 15 including a rear portion 15a that, to a longitudinal depth that corresponds to the longitudinal height of the spigot 12, has an internal diameter that mates with the external diameter of the spigot 12, i.e., there is a slide-fit between the spigot 12 and the cavity 15. The female member can e.g., be a turning tool or a milling tool.

In the region adjacent its bottom or front end, the cavity 15 comprises a front portion 16 having a bigger internal diameter than the rear portion 15a of the cavity 15 having slide-fit with the spigot 12. The reason for that will be explained below.

At its left side in FIG. 1 the female member 11 includes a radial retaining pin 17. A conical inner end portion 18 of the pin 17 extends into the cavity portion 16. The pin 17 is received in an internally threaded radial boring 19 of the female member that cooperates with an externally threaded portion 20 of the pin 17.

An intermediate portion 21 of the pin 17 bridges the pointed portion 18 and the externally threaded portion 20. The intermediate portion 21 is received in an opening 22 in the female member 11, said the opening 22 having a reduced diameter compared to the internally threaded boring 19. As can be seen from FIG. 1 the intermediate portion 21 rests on the lower part of the opening 22.

The pin 17 is stationary during normal operative conditions. However, due to the threaded connection between the pin 17 and the boring 19 it is possible to exchange the pin 17, e.g., when it is damaged. For that reason the pin 17 is in the shape of an Allen screw.

As is apparent from below, the disclosed embodiment envisions the use of two pins 17 (see FIG. 4b).

At its right side in FIG. 1 the female member 11 includes a clamping member in the form of a screw 23 also in the shape of an Allen screw. The clamping screw 23 has an externally threaded portion 24 that is received in an internally threaded radial boring 25 of the female member. An intermediate portion 26 of the clamping screw 23 is received in an opening 27, and a conical inner end portion 28 of the screw 23 projects into the portion 16 of the cavity 15.

The intermediate portion 26 of the clamping screw 23 rests on the lower part of the opening 27.

The clamping screw 23 can be displaced in its axial direction, i.e., in the radial direction of the spigot by means of an Allen key.

Figure 2:
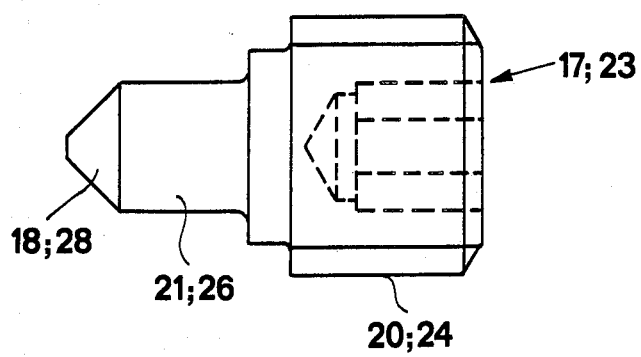
FIG. 2 is a side view of a pin being included in the device according to the invention.

An Allen screw of the type used for the pins 17 and the clamping screw 23 is shown in FIG. 2.

Figure 3:
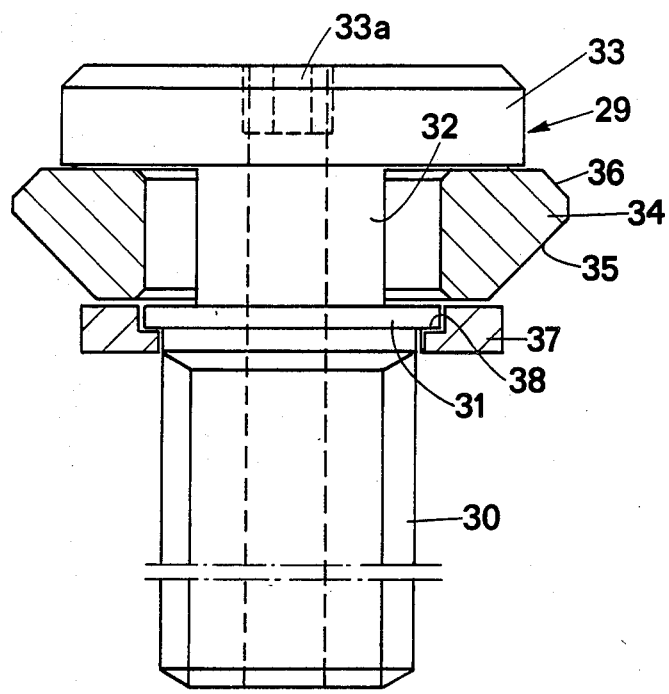
FIG. 3 is a side view of a screw assembly being included in the device of the invention.

The screw assembly 14 is also disclosed in FIG. 3 and the assembly 14 includes a connection in the form of a screw 29 having an externally threaded shaft 30, a collar 31 having a larger diameter than the shaft 30, a neck 32 having a smaller diameter than the collar 31, and a head 33 having a larger diameter than the neck 32. The head 33 is provided with a hexagonal cavity 33a to cooperate with an Allen key.

A floating washer 34 surrounds the neck 32 of the screw 29, the washer 34 having an external diameter that is smaller than the internal diameter of the slide-fit portion 15a of the cavity 15. Also, the internal diameter of the washer 34 is larger than the external diameter of the collar 31 in order to make it possible to push the washer 34 onto the neck past the collar 31. Since the external diameter of the neck 32 is smaller than the internal diameter of the washer 34, i.e., a radial play exists, and since the height of the neck 32, i.e., the distance between the rear side of the head 33 and the front side of the collar 31, is larger than the height of the washer 34, the washer 34 can perform a floating motion relative the neck 32 in the radial direction of the screw 29. This explains the expression "floating" as used herein.

The outer peripheral surface of the floating washer 34 includes two outer peripheral or envelope surfaces 35 and 36 each being of frusto-conical shape.

The first envelope surface 35 tapers forwardly towards the shaft 30 of the screw 29 while the second envelope surface 36 tapers forwardly towards the head 33 of the screw. In the position disclosed in FIG. 1 the first envelope surface 35 is located rearwardly of the second envelope surface 36.

A supporting washer 37 surrounds the collar 31, are includes a step 38 that contacts the rear side of the collar 31.

As can be seen from FIG. 1, in the mounted position of the screw assembly 14, the supporting washer 37 rests on the spigot 12 and the collar 31 rests on the step 38 of the supporting washer 37. The cooperation of the spigot 12, the supporting washer 37 and the collar 31 thus defines the correct position of the screw assembly 14 relative to the male member 10.

With reference to FIGS. 4a-6b the operation of the device according to the present invention will be described.

Figure 4A:
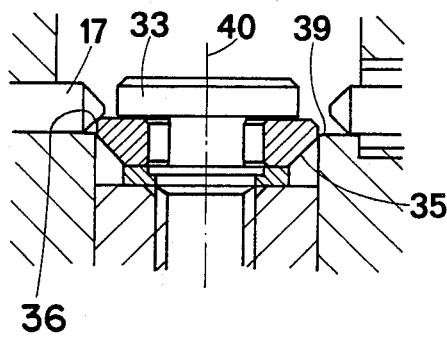
FIGS. 4a-6b disclose in section and top view different stages of the coupling procedure.
Figure 4B:
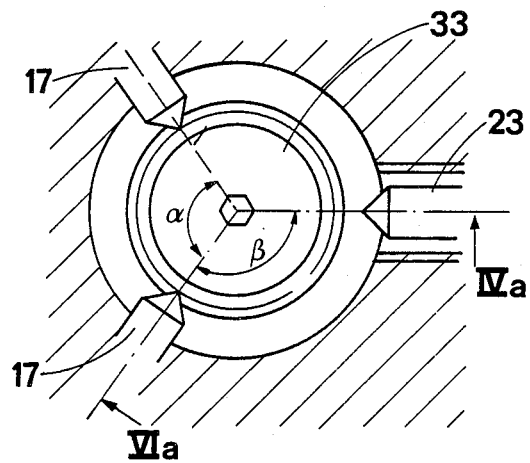

In the position depicted in FIGS. 4a and 4b the spigot 12 of the male member 10 is in the process of being inserted into the cavity 15 of the female member 11.

From FIG. 4a it is quite obvious that when a pin 17 contacts the floating washer 34 the second or front conical envelope surface 36 will cooperate with the conical end 18 of the pin 17 and the washer 34 is displaced radially to the right in FIGS. 4a and 4b when the spigot 12 is pushed further into the cavity 15. Due to its first or rear frusto-conical envelope surface 35, displacement can take place without any interference between the washer 34 and the inner or front end 39 of the slide-fit portion 15a of the cavity 15.

Figure 5A:
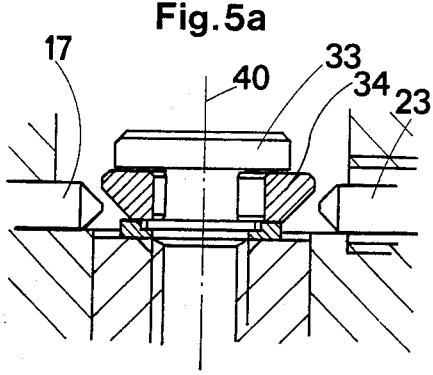
Figure 5B:
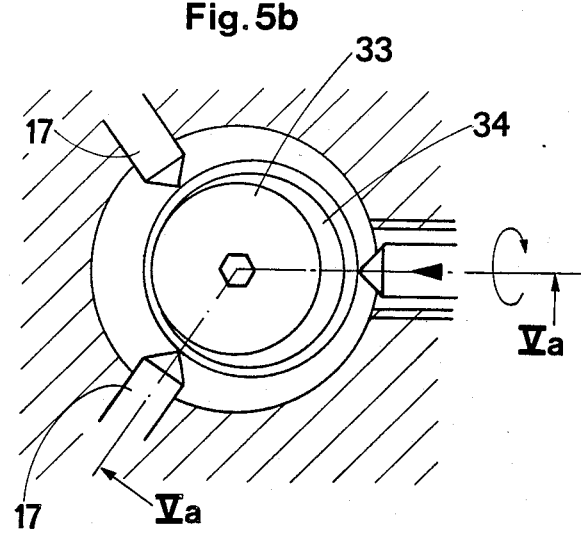

In the position according to FIGS. 5a and 5b the spigot 12 is fully inserted into the cavity 15. The floating washer 34 in order to bypass the pins 17, has been radially displaced to an eccentric position relative to a longitudinal center axis 40 of the screw 29. The eccentric position of the floating washer 34 is quite clear from both FIGS. 5a and 5b. This is permitted by the fact that the clamping screw 23 does not project as far radially inwardly as the pins 17.

Figure 6A:
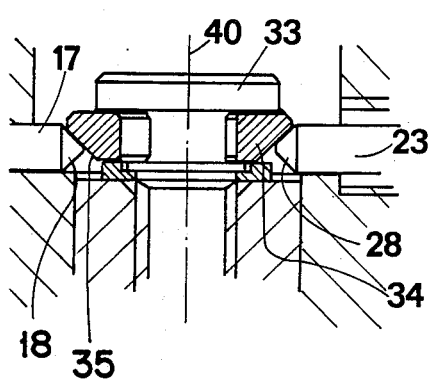
Figure 6B:
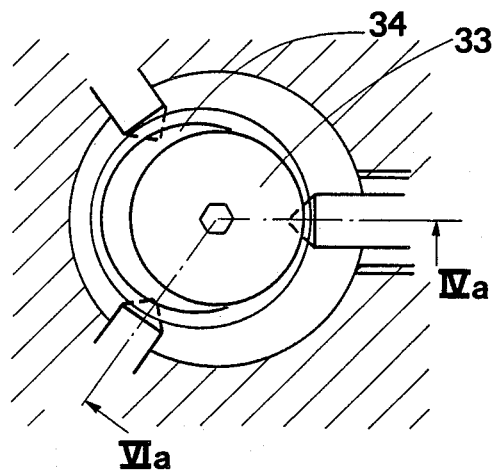

In order to effect the coupling between the male member 10 and the female member 11, the clamping screw 23 is displaced radially inwardly, i.e., to the left in FIGS. 6a and 6b. This displacement causes the conical tip 28 of the clamping screw 23 to cooperate with the first conical envelope surface 35 of the floating washer 34. The displacement of the screw 23, via an Allen key, to the left in FIGS. 6a and 6b in the radial direction of the screw 23 brings about a corresponding displacement of the floating washer 34. In FIGS. 6a and 6b the final positions of the clamping screw 23 and the floating washer 34 are disclosed, i.e., the coupling of the male member 10 and the female member 11 is completed.

From FIGS. 6a and 6b it is evident that the floating washer 34 has an eccentric final position relative to the longitudinal center axis 40 of the clamping screw 23.

In the position disclosed in FIGS. 6a and 6b the conical ends 18 and 28 of the pins 17 and the clamping screw 23, via the first frusto-conical envelope surface 35, exert forward axial forces upon the head 33 of the screw 29. These forward axial forces are then transferred to the spigot 12 via the externally threaded shaft 30 and the internally threaded boring 13 of the spigot 12.

From FIG. 4b it should be noted that the angle $\alpha$ between the longitudinal center axes of the pins 17 is smaller than the angle $\beta$ between the longitudinal axis of one of the pins 17 and the longitudinal axis of the clamping screw 23. Exemplifying values are $\alpha = 110°$ and $\beta = 125°$. The reason for this design is that if equal spacing were instead is used there might be a risk that the washer 34 could become stuck between the pins 17 in its operative position.

When the male member 10 and the female member 11 are to be uncoupled the clamping screw 23, via an Allen key, is displaced radially outwardly, i.e., to the right in FIGS. 6a and 6b until the position of FIGS. 5a and 5b is reached. Then the spigot 12 can be drawn out of the cavity 15.

The present invention is in no way restricted to the embodiment described above. Thus, the ends 18 of the pins 17 and the end 28 of the clamping member 23 need not be conical but can have a concave shape that mates with the first frusto-conical envelope surface 35. This means that the pins 17 and the clamping screw 23 would not be rotatable and thus the displacement of the clamping screw would be carried out by a different type of activating element.

The connection between the shaft 30 of the screw 29 and the internal boring need not be effected by threads but e.g., through a bayonet joint.

Also in other aspects the invention can be varied freely within the scope of the appending claims.

I claim:

1. A male member and female member coupled together by connecting means:

said male member including a longitudinally forwardly projecting spigot in which there is formed a forwardly open, rearwardly extending recess, said female member including a rearwardly open, forwardly extending cavity, a portion of said cavity receiving said spigot with a sliding fit, at least two retaining pins mounted in said female member and lying in a common radial plane, said pins including inner ends projecting generally radially into said cavity, and a clamping member mounted in said female member and lying in said common radial plane, said clamping member being displaceable generally radially inwardly and outwardly, said connecting means comprising a fastener including:

a shaft detachably secured in said recess, a collar disposed forwardly of said shaft and having a larger cross-sectional dimension than that of said shaft, rearward movement of said collar being opposed by a front end of said spigot, a neck arranged forwardly of said collar, a head connected to a front end of said neck and having a cross-sectional dimension larger than that of said neck, and a radially floatable washer mounted with radial play on said neck, said floatable washer including an outer peripheral surface sized to permit said floatable washer to be inserted longitudinally into and from said cavity, whereupon said outer peripheral surface contacts said inner ends of said retaining pins and is displaced radially thereby to permit passage of said floatable washer longitudinally past said retaining pins.

2. Apparatus according to claim 1, wherein said outer peripheral surface includes a rear surface portion which tapers rearwardly, said rear surface portion engaging said inner ends of said retaining pins and an inner end of said clamping member to be secured thereby against rearward dislodgement from said cavity.

3. Apparatus according to claim 1, wherein said outer peripheral surface comprises a front surface portion which tapers forwardly, said front surface portion adapted to make contact with said retaining pins during insertion of said spigot to produce said radial displacement of said washer.

4. Apparatus according to claim 3, wherein said front and rear surface portions are of frusto-conical shape.

5. Apparatus according to claim 1, wherein said outer peripheral surface comprises a front surface portion which tapers forwardly, said front surface portion adapted to make contact with said retaining pins during insertion of said spigot to produce said radial displacement of said washer.

6. Apparatus according to claim 1 including a supporting washer mounted on said fastener longitudinally between said collar and said front end of said spigot for transmitting longitudinal forces from said floatable washer to said spigot.

7. Apparatus according to claim 1, wherein said cavity includes a front portion of enlarged circular cross-section disposed forwardly of a rear portion of said cavity, said rear portion being of circular cross-section and defining said portion which receives said spigot with a sliding fit, said retaining pins projecting into said front portion of said cavity such that a radial distance from a longitudinal center axis of said fastener to said inner end of each of said retaining pins is less than one-half of the diameter of said rear portion of said cavity.

8. Apparatus according to claim 1, wherein said retaining pins and said clamping member extend radially such that an angular spacing between said retaining pins is less than an angular spacing between at least one of said retaining pins and said clamping member.

9. Apparatus according to claim 1, wherein said retaining pins, said clamping member, and said fastener comprise screws.

10. A connecting assembly adapted to be mounted in a recess of a spigot of a male member, said connecting assembly comprising a fastener which includes:

a shaft defining a front-to-rear extending longitudinal axis and adapted to be received in the recess, means adapted to detachably secure said shaft within the recess, a collar disposed forward of said shaft and having a larger diameter than said shaft, a neck arranged forwardly of said collar, a head connected to a front end of said neck and having a diameter larger than that of said neck, and a radially floatable washer mounted with radial play on said neck.

11. A connecting assembly according to claim 10, wherein said floatable washer includes an outer peripheral surface comprising a rear surface portion which tapers rearwardly.

12. A connecting assembly according to claim 11, wherein said outer peripheral surface comprises a front surface portion which tapers forwardly.

13. A connecting assembly according to claim 12, wherein said front and rear surface portions are of frusto-conical shape.

14. A connecting assembly according to claim 11, wherein said outer peripheral surface comprises a front surface portion which tapers forwardly.

* * * * *